US006337861B1

(12) United States Patent
Rosen (10) Patent No.: US 6,337,861 B1
(45) Date of Patent: Jan. 8, 2002

(54) METHOD AND APPARATUS TO PROPERLY ROUTE ICMP MESSAGES IN A TAG-SWITCHING NETWORK

(75) Inventor: Eric C. Rosen, Arlington, MA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/241,997

(22) Filed: Feb. 2, 1999

(51) Int. Cl.[7] .............................................. H04L 12/56
(52) U.S. Cl. ...................................... 370/389; 370/341
(58) Field of Search ................................ 370/389, 392, 370/395.52, 465, 469, 471; 714/712

(56) References Cited

U.S. PATENT DOCUMENTS

| | | | |
|---|---|---|---|
| 5,243,342 A | 9/1993 | Kattemalalavadi et al. | 341/106 |
| 5,274,643 A | 12/1993 | Fisk | 370/94.1 |
| 5,353,283 A | 10/1994 | Tsuchiya | 370/60 |
| 5,394,402 A | 2/1995 | Ross | 370/94.1 |
| 5,426,637 A | 6/1995 | Derby et al. | 370/85.13 |
| 5,430,715 A | 7/1995 | Corbalis et al. | 370/54 |

(List continued on next page.)

OTHER PUBLICATIONS

P. Newman et al., "Ipsilon Flow Management Protocol Specification for Ipv4 Version 1.0," Internet Community's Request for Comments No. 1953, (May 1996).
M. Perez et al., "ATM Signaling Support for IP over ATM," Internet Community's Request for Comments No. 1755, (Feb. 1995).
J. Heinanen, "Multiprotocol Encapsulation over ATM Adaptation Layer 5," Internet Community's Request for Comments No. 1483, (Jul. 1993).

M. Laubach, "IP over ATM Working Group's Recommendations for the ATM Forum's Multiprotocol BOF Version 1," Internet Community's Request for Comments No. 1754, (Jan. 1995).
M. Laubach, "Classical IP and ARP over ATM," Internet Community's Request for Comments No. 1577, (Jan. 1994).
Martin de Prycker, *Asynchronous Transfer Mode Solution for Broadband ISDN*, Prentice hall, 1995, pp. 5–11, 87–90.
D. Ginsburg, *ATM Solutions for Enterprise Internetworking*, Addison–Wesley Longman 1996, pp. xv–xiv, 36–41, 72–76.

(List continued on next page.)

*Primary Examiner*—Douglas Olms
*Assistant Examiner*—Ken Vanderpuye
(74) *Attorney, Agent, or Firm*—Cesari and McKenna, LLP (57) ABSTRACT

A tag-switching router on a tag-switching network properly generates and forwards an ICMP message when an input packet containing a faulty tagged IP datagram is received. The faulty IP datagram includes source and destination IP addresses and is prepended with a tag stack containing a top tag entry having a top tag. Using the top tag to point to an entry in a forwarding table, the tag-switching router retrieves both a replacement tag and the identity of a forwarding link, and replaces the top tag in the tag stack with the replacement tag. The tag-switching router prepends the tag stack containing the replacement tag to an output IP datagram, which contains the ICMP message and also includes the faulty IP datagram's source IP address as its destination IP address, and discards the faulty IP datagram. The tag-switching router forwards the output IP datagram in an output packet over the forwarding link so that the ICMP message continues over the route that was originally specified for the faulty IP datagram. When the ICMP message finally leaves the tag domain, i.e., when it reaches a router that does not perform tag switching, it is turned around and sent back onto the tag-switching network and, in accordance with the destination IP address of the output IP datagram, back over the original route to the source of the faulty IP datagram.

15 Claims, 9 Drawing Sheets

U.S. PATENT DOCUMENTS

| | | | | |
|---|---|---|---|---|
| 5,452,294 | A | 9/1995 | Natarajan | 370/54 |
| 5,473,599 | A | 12/1995 | Li et al. | 370/16 |
| 5,491,692 | A | 2/1996 | Gunner et al. | 370/85.13 |
| 5,500,860 | A | 3/1996 | Perlman et al. | 370/85.13 |
| 5,519,704 | A | 5/1996 | Farinacci et al. | 370/85.13 |
| 5,555,256 | A | 9/1996 | Calamvokis | 370/60.1 |
| 5,561,669 | A | 10/1996 | Lenney et al. | 370/60.1 |
| 5,594,732 | A | 1/1997 | Bell et al. | 370/401 |
| 5,617,417 | A | 4/1997 | Sathe et al. | 370/394 |
| 5,617,421 | A | 4/1997 | Chin et al. | 370/402 |
| 5,621,721 | A | 4/1997 | Vantuone | 370/16 |
| 5,623,492 | A | 4/1997 | Teraslinna | 370/397 |
| 5,650,993 | A | 7/1997 | Lakshman et al. | 370/236 |
| 5,651,002 | A | 7/1997 | Van Seters et al. | 370/392 |
| 5,659,542 | A | 8/1997 | Bell et al. | 370/496 |
| 5,673,265 | A | 9/1997 | Gupta et al. | 370/432 |
| 5,740,171 | A | 4/1998 | Mazzola et al. | 370/392 |
| 5,740,176 | A | 4/1998 | Gupta et al. | 370/440 |
| 5,742,604 | A | 4/1998 | Edsall et al. | 370/401 |
| 5,764,636 | A | 6/1998 | Edsall | 370/401 |
| 5,793,763 | A | 8/1998 | Mayes et al. | 370/389 |
| 5,835,494 | A | 11/1998 | Hughes et al. | 370/397 |
| 5,838,994 | A | 11/1998 | Valizadeh | 395/876 |
| 5,867,666 | A | 2/1999 | Harvey | 395/200.68 |
| 5,931,961 | A * | 8/1999 | Ranganathan et al. | 714/712 |
| 6,061,454 | A * | 5/2000 | Malik et al. | 380/278 |
| 6,203,271 | B1 * | 5/2001 | Wadlow et al. | 713/201 |

OTHER PUBLICATIONS

R. Ullmann, "Rap: Internet Route Access Protocol," Internet Community's Request for Comments No. 1476, (Jun. 1993).

M. McGovern, et al., "CATNIP: Common Architecture For The Internet," Internet community's Request for Comments No. 1707, (Oct. 1994).

S. Deering, et al., "Internet Protocol, Version 6," Internet Community's Request for Comments No. 1883, (Dec. 1995).

Information Technology–Telecommunications And Information Exchange Between Systems—Protocol For Exchange Of Inter–Domain Routeing Information Among Intermediate Systems To Support Forwarding Of ISO 8473 PDU's, *International Standard ISO/IEC*, Oct. 1, 1994.

Amendment 1, International Standard ISO/IEC, 10747 (Jul. 15, 1996).

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route–Based IP Switching," Internet Draft, (Mar. 1997).

P. Newman et al., "Ipsilon's General Switch Management Protocol Specification Version 1.1," Internet Community's Request for Comments No. 1987, (Aug. 1996).

N. Feldman, "ARIS Specification," Internet Draft, (Mar. 1997).

"ISDN Data Link Layer Specification for Frame Mode Bearer Services," CCITT Recommendation Q.922, International Telecommunication Union, Geneva, 1992.

"Digital Subscriber Signalling System No. 1 (DSS 1)—Signalling Specification for Frame Mode Basic Call Control," ITU–T Recommendation Q.933, International Telecommunication Union, Geneva, 1994.

G. P. Chandranmenon and G. Varghese, "Trading Packet Headers for packet Processing," Proc. ACM SIGCOMM '95, Boston, MA, Sep. 1995, pp. 162–173.

Callon et al., "A Framework for Multiprotocol Label Switching," IETF Network Working Group Internet Draft draft–ietf–mpls–framework–02.txt, Nov. 21, 1997.

Rosen et al., "A proposed Architecture for MPLS," IETF Network Working Group Internet Draft draft–ietf–mpls–arch–00.txt, Aug. 1997.

Woundy et al., "ARIS: Aggregate Route–Based IP Switching," Internet Draft draft–woundy–aris–ipswitching–00.txt, Nov. 1996.

Kalyaranaman et al., "Performance and Buffering Requirements of Internet Protocols over ATM ABR and UBR Services," *IEEE Communications magazine*, vol. 36, No. 6, Jun. 1998.

* cited by examiner

METHOD AND APPARATUS TO PROPERLY ROUTE ICMP MESSAGES IN A TAG-SWITCHING NETWORK

RELATED APPLICATIONS

The subject application is related to the following copending applications:

U.S. patent application Ser. No. 08/997,343 filed Dec. 23, 1997, and entitled, "PEER-MODEL SUPPORT FOR VIRTUAL PRIVATE NETWORKS WITH POTENTIALLY OVERLAPPING ADDRESSES";

U.S. patent application Ser. No. 09/149,193 filed Sep. 8, 1998, and entitled, "USE OF A SINGLE DATA STRUCTURE FOR LABEL FORWARDING AND IMPOSITION";

U.S. patent application Ser. No. 09/149,403 now U.S. Pat. No. 5,991,300 filed Sep. 8, 1998, and entitled, "TECHNIQUE FOR EFFICIENTLY PERFORMING OPTIONAL TTL PROPAGATION DURING LABEL IMPOSITION";

U.S. patent application Ser. No. 09/201,337 filed Nov. 30, 1998, and entitled, "CONGESTION AVOIDANCE ON COMMUNICATIONS NETWORKS";

U.S. patent application Ser. No. 09/217,976 filed Dec. 21, 1998, and entitled, "VIRTUAL PRIVATE NETWORK EMPLOYING EGRESS-CHANNEL SELECTION"; and U.S. patent application Ser. No. 09/232,947 filed Jan. 19, 1999, and entitled, "SHARED COMMUNICATIONS NETWORK EMPLOYING VIRTUAL-PRIVATE-NETWORK IDENTIFIERS".

Each of said copending applications is assigned to the Assignee of the subject application and is incorporated herein by reference in its entirety.

BACKGROUND OF THE INVENTION

The present invention is directed to communications networking. It is directed particularly to the routing of ICMP messages in tag-switching networks.

Figure 1:
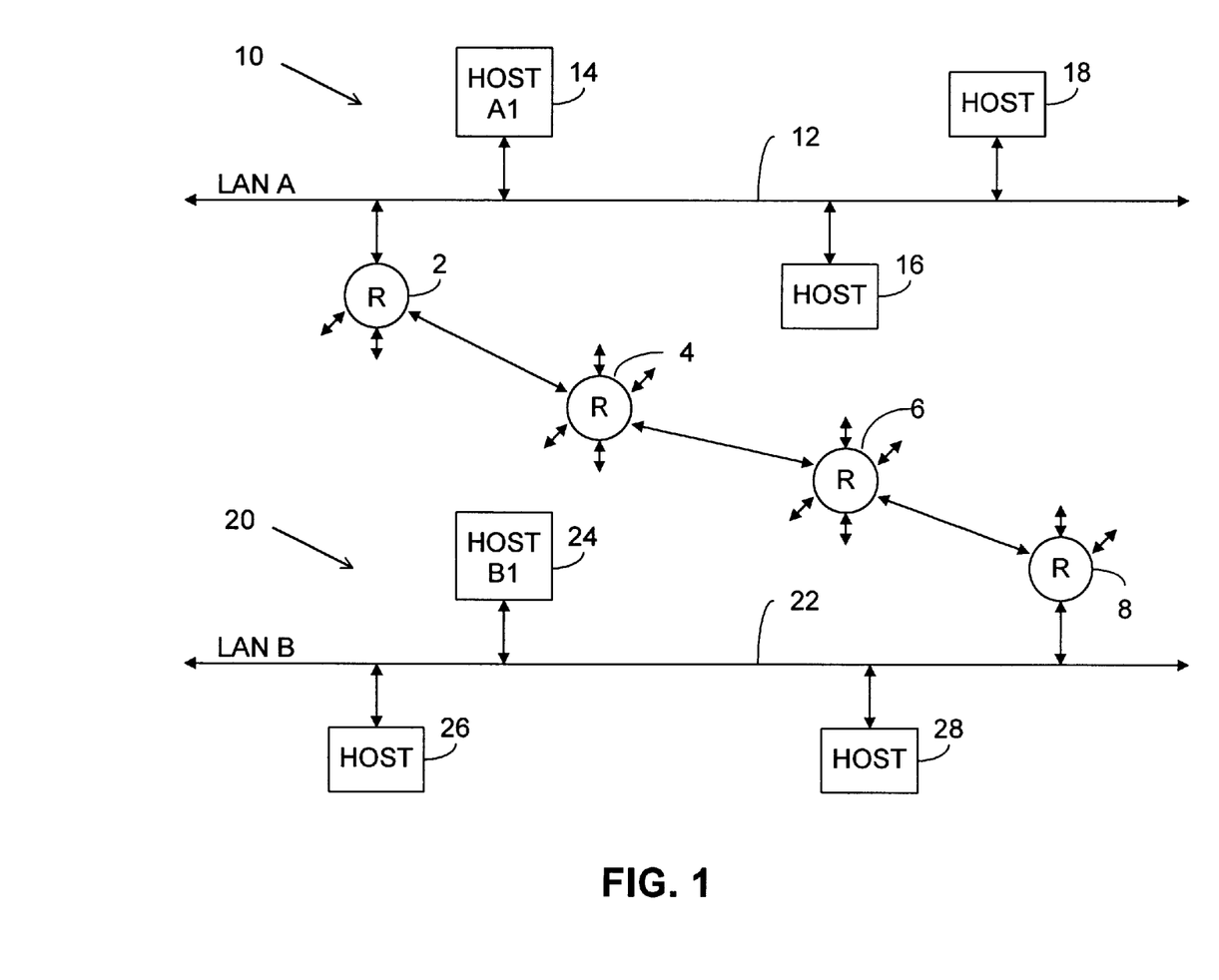
FIG. 1 discussed above, depicts two local area networks interconnected by a backbone of routers.

Two local area networks, LAN A 10 and LAN B 20, interconnected through a "backbone" of routers 2, 4, 6, 8 are shown in FIG. 1. A router may have a plurality of interfaces to one or more local networks or to other routers. LAN A includes a router 2 and three host devices 14, 16, 18 which can communicate directly with each other over LAN A bus 12, and LAN B includes a router 8 and three host devices 24, 26, 28 which can communicate directly with each other over LAN B bus 22. The exchange of data between a LAN A device, e.g. HOST A1 14, and a LAN B device, e.g. HOST B1 24, is typically accomplished using an Internet Protocol (IP) datagram. The IP datagram is forwarded in the payload field of link-layer, e.g. Ethernet, communications packets that are exchanged between the backbone routers. The use of an IP datagram allows for the routing of data between network devices that do not have a link-layer connection and, therefore, cannot exchange link-layer packets with each other.

Figure 2:
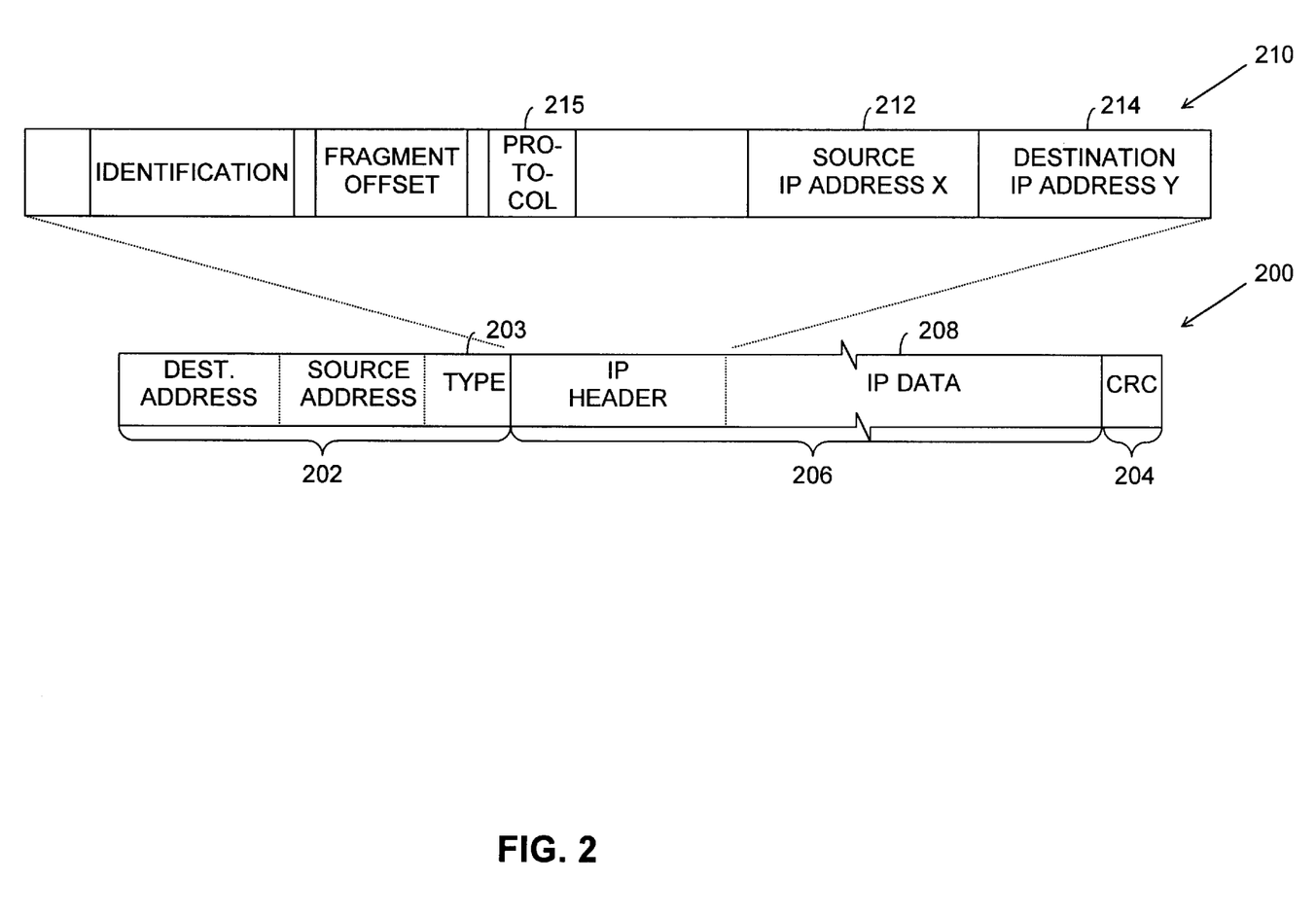
FIG. 2 discussed above, illustrates the format of an Ethernet packet containing a IP datagram and sent from one router to another.

An Ethernet packet 200 having an IP datagram in its payload field 206 is shown in FIG. 2. The IP datagram is encapsulated between an Ethernet header field 202 and a trailing CRC field 204. The Ethernet header field 202 includes a type field 203 that specifies that the payload field 206 contains an IP datagram. The IP datagram includes an IP payload field 208 preceded by an IP header field 210. The IP header field 210 is comprised of a source IP address field 212 (containing IP address "X"), a destination IP address field 214 (containing IP address "Y"), and a protocol field 215. The source address field 212 identifies the originator of the IP datagram, e.g. HOST A1 14, and the destination address field 214 identifies the intended recipient of the IP datagram, e.g. HOST B1 24.

A backbone router typically determines the link over which the IP datagram is to be forwarded by referring to a forwarding table, which contains routing information maintained by the router. Using the "Y" address in the destination IP address field 214, the router performs a longest match search against IP addresses stored in the table. Unfortunately, because the IP address space is so large, the forwarding table may have to very large. More importantly, a longest match search through the forwarding table can be time consuming and result in the expenditure of valuable router processing resources and a slowing of the movement of packets through the network.

A technique known variously as "tag-switching" or "label-switching" is one way of avoiding the longest match searches. Although packets forwarded by a tag-switching router contain a destination IP address, each packet also includes a stack of one or more "tags," or "labels," employed for forwarding. Although the invention to be described below is not limited to any particular implementation of tag switching, one popular method for implementing it is called Multi-Protocol Label Switching (MPLS) as described in commonly assigned co-pending U.S. patent application Ser. No. 08/997,343, filed Dec. 23, 1997, by Rekhter et al. for Peer-Model Support for Virtual Private Networks with Potentially Overlapping Addresses, and is hereby incorporated in its entirety by reference. When a tag-switching router receives a tagged packet, it uses the top tag in the tag stack to identify an entry in its forwarding table that specifies the next link of the route to the packet's destination. In addition to the forwarding link, the entry typically includes a replacement tag. The receiving tag-switching router replaces the top tag in the stack with the replacement tag before forwarding the IP datagram over the next link.

Figure 3:
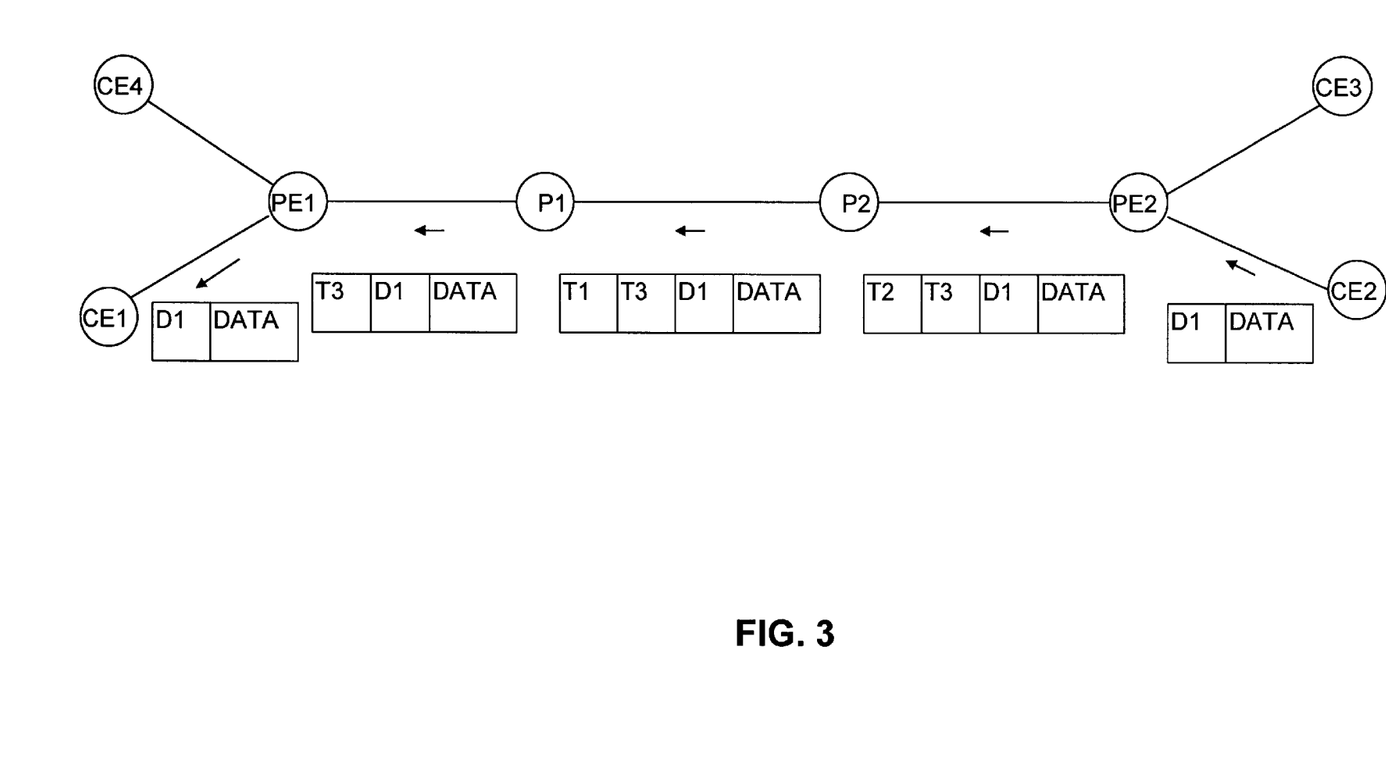
FIG. 3 discussed above, is a topological diagram of a tag-switching network and a tagging sequence employed for a tagged IP datagram.

FIG. 3 illustrates the exchange of an IP datagram over one type of tag-switching network. The tag-switching network is comprised of a first tag-switching edge router PE1 interfacing to a first customer edge router CE1 of a first local network; two tag-switching transit routers P1, P2 connecting the tag-switching edge router PE1 to a second tag-switching edge router PE2; and tag-switching edge router PE2 interfacing to a second customer edge router CE2 of a second local network.

Figure 4:
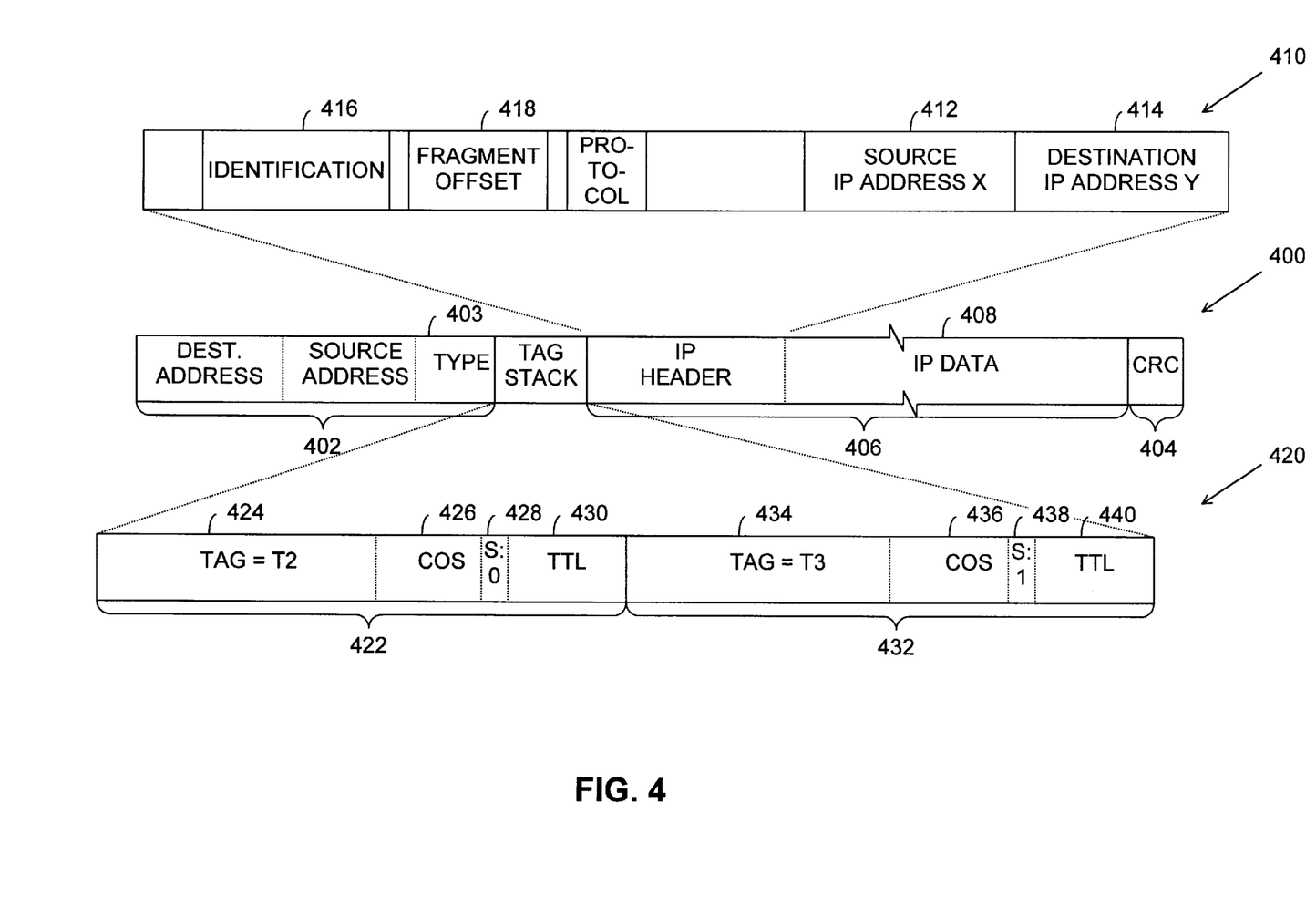
FIG. 4 discussed above, illustrates the format of an Ethernet packet containing a tagged IP datagram and exchanged between tag-switching transit routers.

We assume that customer router CE2 sends tag-switching edge router PE2 a Ethernet packet of the type depicted in the second row of FIG. 1 and without a tag stack of the type now to be described. Edge router PE2 prepends such a tag stack before it forwards the packet to transit router P2. Specifically, an Ethernet packet 400 containing a tagged IP datagram and forwarded from edge router PE2 to transit router P2 is shown in FIG. 4. As described above, the Ethernet packet 400 contains a payload field 406 that is encapsulated between the Ethernet header field 402 and a trailing CRC field 404. The Ethernet header field 402 includes a type field 403 that specifies that the payload field 406 contains an MPLS protocol data unit, such as a tagged IP datagram. The payload field 406 holds an IP datagram comprised of an IP payload field 408 preceded by an IP header field 410. The IP header field 410, shown in detail in the first row, includes a source IP address field 412 (containing IP address "X"), a destination IP address field 414 (containing IP address "Y"), an identification field 416, and a fragment offset field 418. In this case, however, the IP payload field 406 is prepended with a tag stack field 420 that contains a top tag stack entry 422 and a bottom tag stack entry 432. Each tag stack entry 422, 432 includes a tag field 424, 434 pointing to an entry in the forwarding table, a "class of service" (COS) field 426, 436, an "end-of-stack" (S) field 428, 438 set to "one" in the bottom tag stack entry 432, and a "time-to-live" (TTL) field 430, 440 to be described below. For simplicity, only the destination IP address field 414 (containing IP address "D1") and the IP payload field 408 (containing "DATA") of the IP datagram are shown in FIG. 3.

Although the formats described in FIGS. 2 and 4 are typical formats for packets exchanged between tag-switching routers, they are not the only formats that such routers may employ. The formats employed on some "Ethernet" links are actually somewhat more complicated than the format depicted here. Moreover, routers that communicate with each other over a point-to-point link, i.e., not by way of a shared medium, typically would employ a link-level protocol, such as SLIP or PPP, that is different from the Ethernet protocol just described. An implementation that is particularly desirable for highcapacity links employs Asynchronous Transfer Mode ("ATM") switches.

Figure 5:
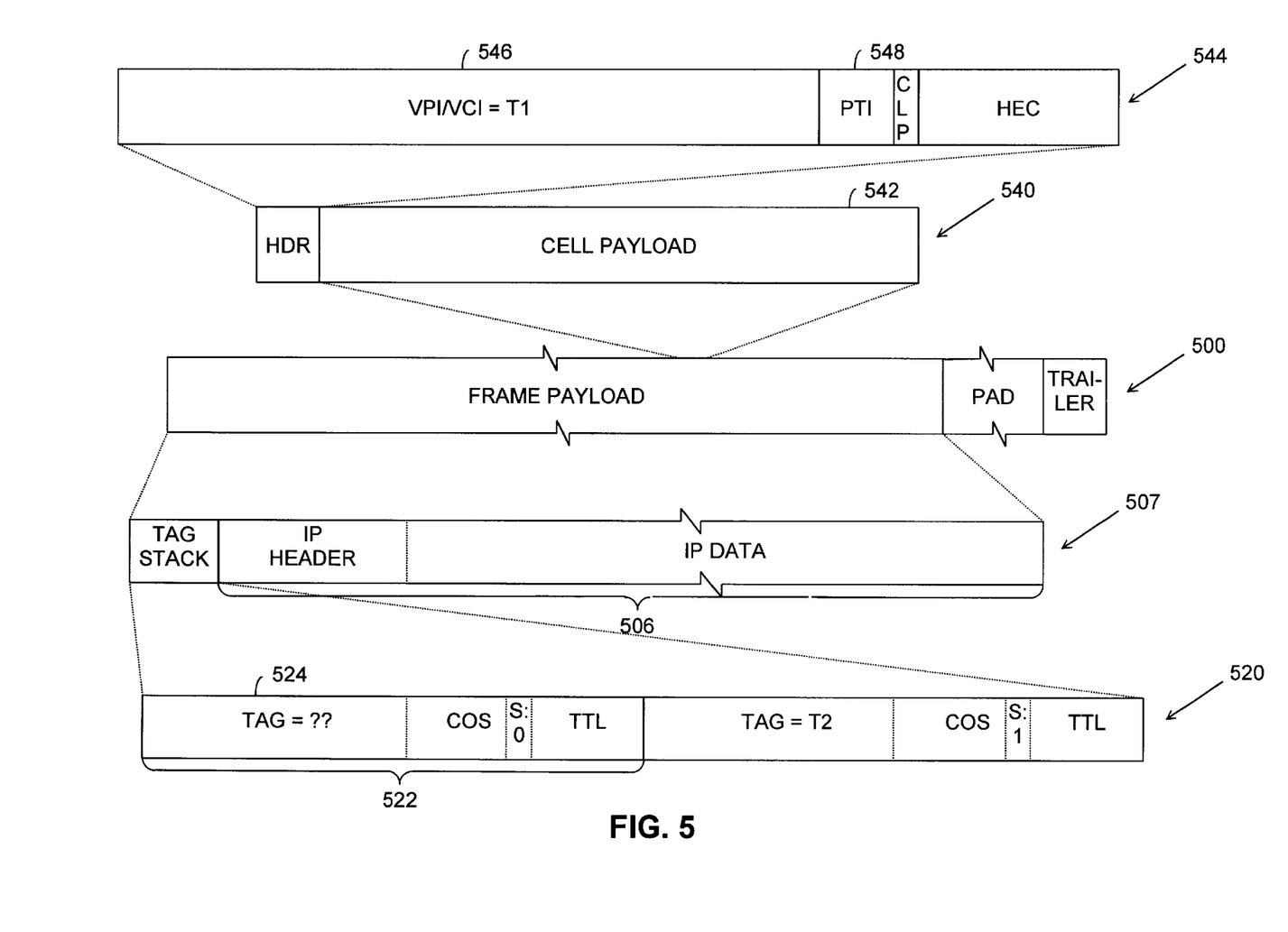
FIG. 5 discussed above, illustrates the format of an ATM frame containing a tagged IP datagram and exchanged between tag-switching transit routers.

An ATM frame 500 having an IP datagram in its payload field 507 is shown in FIG. 5. The IP datagram field 506 and a tag stack field 520 of the payload field 507 are similar to the IP datagram field 406 and tag stack field 420 encapsulated by the Ethernet header 402 and trailer 404 of FIG. 4. The only difference is that the top tag field 524 of the top tag stack entry 522 contains question marks, which indicate that the top tag's contents do not matter.

The reason why the top tag's contents do not matter is that the routing decisions, which are based on those contents when the tag-switching router is implemented as a conventional IP router, are instead based on an ATM VPI/VCI field 546 found in the cell header field 544 of an ATM "cell" 540 when the tag-switching router is implemented as an ATM switch. From the point of view of an ATM client, the ATM frame 500 is the basic unit of transmission, and it can vary in length to as much as 64 Kbytes of payload. (Those skilled in the art will recognize that there are also other possible ATM frame formats, but FIG. 5's third row depicts one, known as "AAL5," that would typically be employed for user data.) From the ATM switch's point of view, though, the basic transmission units are fixed-size cells into which the frames are divided. The cell header field 544, shown in detail in the first row, also includes a PTI field 548. One purpose of the PTI field 548 is to indicate whether its cell is the last one in a frame. If it is, its last eight bytes form the frame trailer field 504. Among other things, the trailer field 504 indicates how much of the preceding cell's payload field 542 is comprised of actual payload, as opposed to padding used to complete a fixed-size cell.

The VPI/VCI field 546 is of particular interest to the present discussion. As is well known to those skilled in the art, ATM systems organize their routes into "virtual channels," which may from time to time be grouped into "virtual paths." Each switch associates a local virtual path/virtual channel indicator (VPI/VCI) with a channel or path that runs through it. When an ATM switch receives a cell, it consults the cell's VPI/VCI field 546 to identify by table lookup the interface through which to forward the cell. It also replaces that field's contents with a value indicated by the table as being the next switch's code for that path or channel, and it sends the resultant cell to the next switch. In other words, the function performed by the VPI/VCI field 546 enables it to serve as the tag stack's top tag. This is why a tag-switching router implemented as an ATM switch can ignore the top tag field 524, on which other implementations rely.

When tag-switching edge router PE2 receives an IP datagram from customer edge router CE2, it prefixes a first tag T3 that identifies an entry in the forwarding table of the destination tag-switching edge router PE1. The edge router PE2 then prefixes a second, or top, tag T2 that identifies an entry in the forwarding table of the next router, i.e., the first transit router P2, in the backbone path. When the transit router P2 receives the IP datagram, it uses the top tag T2 to identify the location in its forwarding table that specifies the forwarding link and a replacement tag T1 for the route to the edge router PE1; i.e., the transit router P2 does not have to perform a time-consuming longest-match search. It then replaces the top tag T2 with the replacement tag T1 that identifies an entry in the forwarding table of the second transit router P1 in the backbone path and forwards the IP datagram. (We assume that, as in the typical case, there are several transit routers in the backbone path, although in some configurations there may be none and only a single tag will be prefixed. All transit routers, except the last transit router in the backbone path, perform in a manner similar to that of transit router P2.) When the second transit router P1, which is also the last transit router in the backbone path, receives the IP datagram, it strips the top tag T1 and uses it to identify an entry in its forwarding table specifying the forwarding link and then forwards the IP datagram without replacing tag T1. This "exposes" tag T3. When the edge router PE1 receives the IP datagram, it strips the top tag, first tag T3, and uses it to identify an entry in its forwarding table specifying the forwarding link. It then transmits the data packet to the destination customer edge router CE1 over the forwarding link.

Note that this arrangement, in which the transit routers forward data packets in accordance with entries for the route to the edge router PE1 rather than to the alternate destination represented by destination IP address D1, relieves the transit routers of the need to maintain forwarding entries for routers outside the tag-switching backbone. In addition to improving network performance and reducing the router processing burden, a tag-switching network is also ideally suited for the implementation of a virtual private network (VPN) wherein two or more private local networks are securely connected over a public network. A VPN may be utilized by a geographically dispersed enterprise to connect its local area networks and thereby avoid the high cost of leased telephone lines.

The above discussion refers to a service provider's router as an "edge router" if it communicates with a customer's router directly, i.e., without any intermediate service-provider router. Routers PE1 and PE2 are examples. The service-provider backbone routers that interconnect two backbone edge routers are called "transit" routers, e.g. P1 and P2. Note that the terms "edge router" and "transit router" have meaning only by reference to a given route. Although the drawing shows only a single route through the service provider domain, there are typically a very large number. For some of these routes PE1 and/or PE2 may serve as transit routers, and P1 and/or P2 may serve as edge routers. Accordingly, a backbone router may be a transit router in one VPN and an edge router in a second VPN.

It is often the case that customer devices on the VPN are identified by IP addresses that are not globally unique. In fact, the IP addresses in one VPN may overlap with addresses used in other virtual private networks supported by the service provider. As described in detail in U.S. patent application Ser. No. 08/997,343, filed Dec. 23, 1997, by Rekhter et al. for Peer-Model Support for Virtual Private Networks with Potentially Overlapping Addresses, non-globally unique IP addresses are allowed in a VPN because the backbone routers rely on the tags, and not the IP addresses, when forwarding tagged IP datagrams.

However, the use of non-globally unique IP addresses, together with the absence of exterior routes in the transit router forwarding table, may cause two different problems to arise during tagged IP datagram transfers across the VPN backbone. The first problem concerns the "time-to-live" (TTL) field that is usually included in data packets transmitted on a public network. TTL fields are employed to prevent data packets from endlessly circulating through and clogging the public network. The TTL field of a IP datagram is initially filled with a predetermined number. Each time the IP datagram is transferred from one router to another router, the number is decremented. If and when the number in the TTL field decrements to zero, the router holding the IP datagram discards it and generates an Internet Control Message Protocol (ICMP) "Lifetime Exceeded" message for transmission back to the network device identified by the IP source address found in the IP datagram. ICMP messages are used to report errors and other conditions that require device attention.

When an IP datagram is initially tagged upon entry into a tag-switching network, the contents of its TTL field are typically transferred to the TTL field of the top tag. Each time the tagged IP datagram is transferred from one tag-switching router to another, the top tag TTL field is decremented. As is the case with conventional routers, if and when the number in the TTL field decrements to zero, the tag-switching router holding the tagged IP datagram discards it and generates an "Lifetime Exceeded" ICMP message for transmission back to the source device. As was mentioned above, though, the transit router may not have stored forwarding information needed to direct the ICMP message back to the discarded packet's source, so the tag-switching transit router may be unable to route the "Lifetime Exceeded" ICMP message. Among other things, this causes the commonly used "traceroute" tool to fail.

The second problem concerns the "Don't Fragment" (DF) bit that is found in the IP datagram. If the DF bit is set, a router will not fragment the IP datagram into smaller packets. Instead, when a router determines that a IP datagram is too large and the DF bit is set, the router will discard the IP datagram and generate an ICMP "Packet Too Large" message for transmission back to the IP source address found in the data packet. The tag-switching transit router's inability to route the "Packet Too Large" ICMP message cause the "Path MTU Discovery" procedure to fail.

Therefore, what is needed is a method and apparatus to properly route ICMP messages generated at tag-switching transit routers.

SUMMARY OF THE INVENTION

This invention provides a particularly simple method and apparatus for properly routing Internet Control Message Protocol (ICMP) messages in tag-switching backbones that interconnect to conventional Internet Protocol (IP) networks. An IP datagram received by a transit router may have a fault condition wherein it exceeds a lifetime threshold as specified by the "time-to-live" (TTL) field, or because it is too large to transmitted and cannot be fragmented as dictated by the "don't fragment" (DF) bit in the IP datagram header field. When a transit router generates the ICMP message to report the fault back to the originator of the IP datagram, it replaces the received IP datagram with one that contains the ICMP message and forwards it as though it were the original packet.

Until it leaves the tag-switching network, the resultant ICMP message will then continue along the (tag-specified) forward path that the discarded IP datagram would have taken. Then the first non-tag-switching router, e.g., CE1 in the FIG. 3 example, will forward it in accordance with the ICMP message's destination IP address, i.e., the discarded IP datagram's source IP address. The resultant route will typically start with the egress router of the forward path, e.g., PE1 in the FIG. 3 example, which, guided by that destination IP address, will properly tag it for transmission back through the tag-switching network toward the discarded IP datagram's source. All of this is accomplished without requiring any additional routing information in the transit routers.

BRIEF DESCRIPTION OF THE DRAWINGS

The invention description below refers to the accompanying drawings, of which.

DETAILED DESCRIPTION OF AN ILLUSTRATIVE EMBODIMENT

Figure 6:
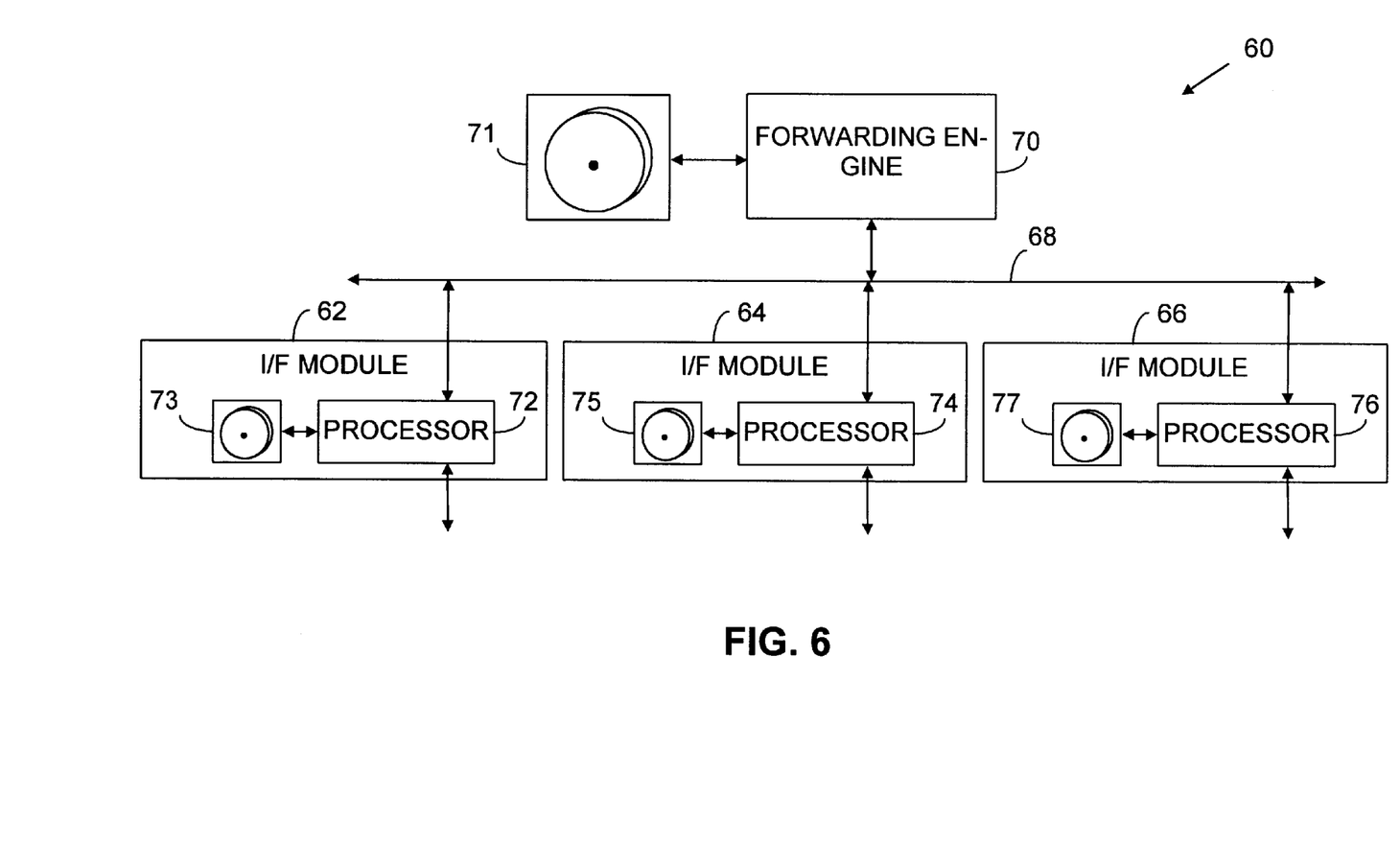
FIG. 6 is a block diagram of a tag-switching router incorporating the present invention.

FIG. 6 is a block diagram of a tag-switching router 60 incorporating the invention.

The operation of a router within a virtual private network (VPN) is described in the above-cited Rekhter et al. application. Although router configurations vary widely, FIG. 6 depicts a typical approach. The tag-switching router 60 is comprised of a forwarding engine 70 and a plurality of interface (I/F) modules 62, 64, 66 which send and receive communications packets to and from remote locations. The forwarding engine 70 is a high-performance processor that controls the routing of packets through the tag-switching router 60. Instructions executed by the forwarding engine 70 are stored in a persistent storage device, such as a magnetic disk media, and are typically accessed from a fast and volatile semiconductor storage device, these storage devices being generally represented by memory circuitry element 71. The I/F modules 62, 64, 66 include a high-performance processor 72, 74, 76 and associated memory circuitry 73, 75, 77 similar to those just described. Packets are routed between the I/F modules via a communications bus 68, which also supports the transfer of routing information between the modules and a forwarding engine 70. It will be recognized by those skilled in the art that different routers may allocate various functions between the forwarding engine and the I/F module processors in different ways, and that the processors may share one or more common storage devices.

As discussed above, a VPN transit router may receive an input packet containing an IP datagram having a fault condition. For example, the input packet's time-to-live (TTL) may have expired, or the don't fragment" (DF) bit of the IP datagram may be set and the input packet may be too large to transmit over the next link in the path without fragmenting it. In either case, a router will typically generate an Internet Control Message Protocol (ICMP) message to inform the originating network device that the packet has been discarded. The ICMP message is sent as an IP datagram whose protocol field 215 identifies it as such a message. Its destination IP address is the source IP address of the IP packet whose removal it reports.

However, a tag-switching transit router would not conventionally be able to forward an ICMP message that it generates against a received tagged IP datagram if, as is sometimes the case in a service provider implemented VPN, there is no guarantee that the source and destination IP addresses of the IP datagram are globally unique. If the IP addresses were globally unique, then the transit router could resort to its conventional IP routing process to determine the forward link of the ICMP. But that would make it necessary for the transit router to maintain routing information for internal routes, and this is a burden of which it is one of MPLS's primary purposes to relieve such routers. As will now be explained, though, the tag-switching router 60 of the present invention forwards ICMP messages properly without requiring unique addresses and without imposing an excessive routing-information burden on transit routers.

Figure 7:
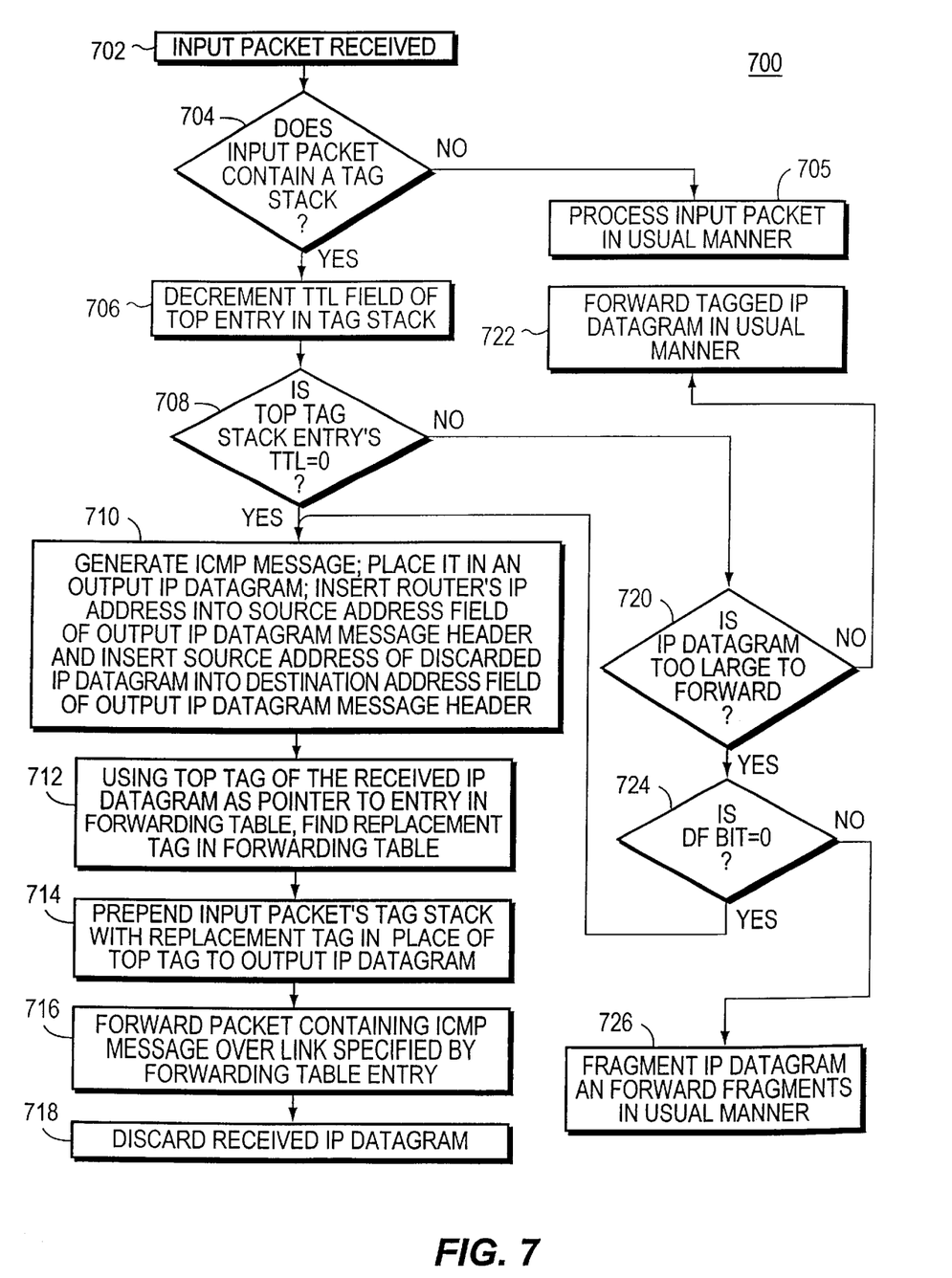
FIG. 7 is flow diagram of the ICMP message generation and forwarding procedure executed by the inventive tag-switching router.

FIG. 7 is a flow diagram of the forwarding procedure executed by a tag-switching router 60, e.g., transit router P2, to route ICMP messages properly. After an input packet is received in the initial step 702, the tag-switching router 60 determines whether the payload has a prepended tag stack field 420 at decision step 704. The tag-switching router 60 can determine the presence of a prepended tag stack field 420 through examination of the type field 403 of the Ethernet packet header 402. If the payload does not have a prepended tag stack, the tag-switching router 60 processes the input packet in accordance with the usual procedure at step 705. If the input packet does include prepended tag stack 420, the tag-switching router 60 decrements the number in TTL field 430 of the top tag at step 706. The payload will typically be an IP datagram as described above.

In decision step 708, the tag-switching router 60 determines whether the number in the TTL field 430 has decremented to zero. If the number equals zero, the tag-switching router 60 generates an ICMP message as shown in the IP payload field 808 of the Ethernet packet 800 of FIG. 8. As it would perform in a non-tag-switching context, the tag-switching router 60 places the tag-switching router's IP address "R" into the source IP address field 812 of the IP header field 810 of the first row of FIG. 8, and places the contents of the source IP address field 412 (i.e., IP address "X") into the destination IP address field 814. In addition, it adjusts the protocol field 815 to reflect the ICMP message payload.

Figure 8:
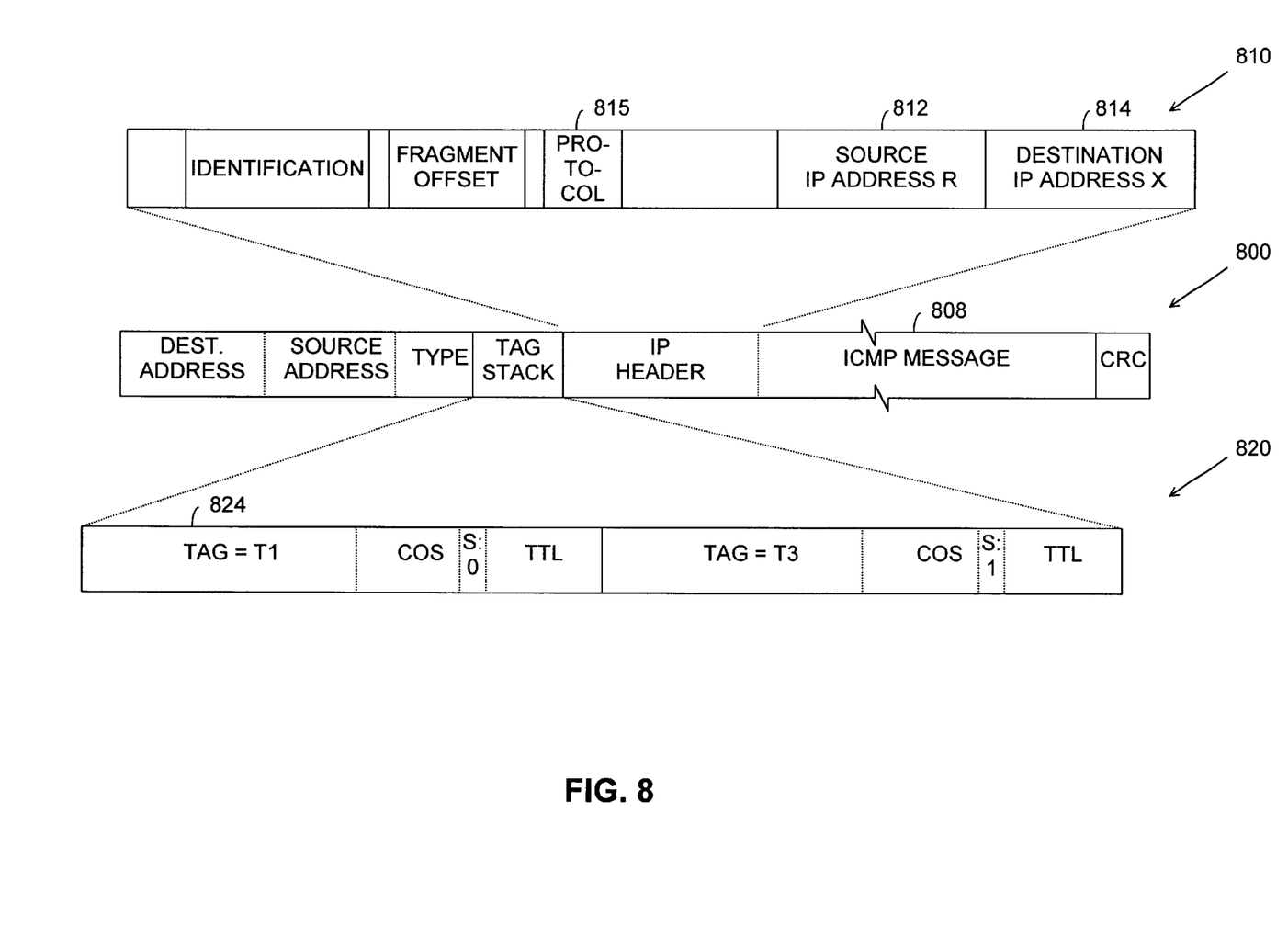
FIG. 8 illustrates the format of an Ethernet packet containing a tagged ICMP message and exchanged between tag-switching transit routers.

The tag-switching router 60 forwards the ICMP message along the forward path as though it were the original tagged IP datagram. In step 712, the tag-switching router 60 uses the top tag field 424 of the input packet to identify a forwarding entry in the forwarding table as described above. The forwarding entry holds the contents of a replacement tag field 824, e.g. T1, that the tag-switching router 60 inserts in place of the top tag field 424, e.g. T2, in the tag stack, together with the identity of the link over which the input packet is to be forwarded. In step 714, the tag-switching router 60 prepends the tag stack field 820 containing the replacement tag as the top tag field 824 to the ICMP message. In step 716, the tag-switching router 60 forwards an Ethernet packet 800 containing the ICMP message with the prepended tag stack over the link identified in the forwarding table entry. The tag-switching router 60 discards the IP datagram in step 718.

If the tag-switching router 60 determines that the number in the TTL field 430 is not decremented to zero in decision step 708, other fault conditions may still arise. For example, in decision step 720, the tag-switching router 60 may determine that the input packet 400 is too large to forward over the link identified in the forwarding table. If not, the tag-switching router 60 forwards the packet in the usual manner at step 722. If the input packet 400 must be fragmented, in decision step 724, the tag-switching router 60 must further check to determine whether the DF bit of the IP header field 410 is set. If the DF bit is set, the tag-switching router 60 generates and transmits the appropriate ICMP message as described in steps 710 through 718.

If the DF bit is not set, the tag-switching router 60 fragments the contents of IP datagram payload field 408 and forwards smaller packets in the usual manner in step 726. The fragments are placed into the IP payload fields 408 of a series of two or more smaller IP datagrams each of which has the source and destination IP addresses of the fragmented IP datagram, and is prepended with the tag stack containing the replacement tag. All of these smaller IP datagrams have the same number in their identification field 416, but their fragment offset fields 418 are assigned ascending numbers depending on their position relative to the first fragment in the series. The destination IP device uses the offset numbers to reassemble the payload of the fragmented IP datagram.

Figure 9:
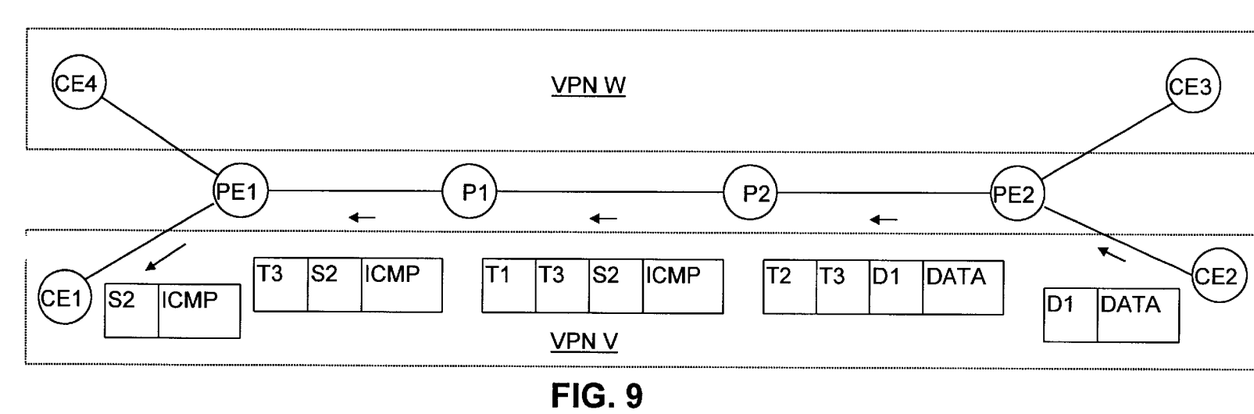
FIG. 9 is a topological diagram of a virtual private network and a tagging sequence employed for an IP datagram and an ICMP message generated in response to an IP datagram fault condition.
Figure 10:
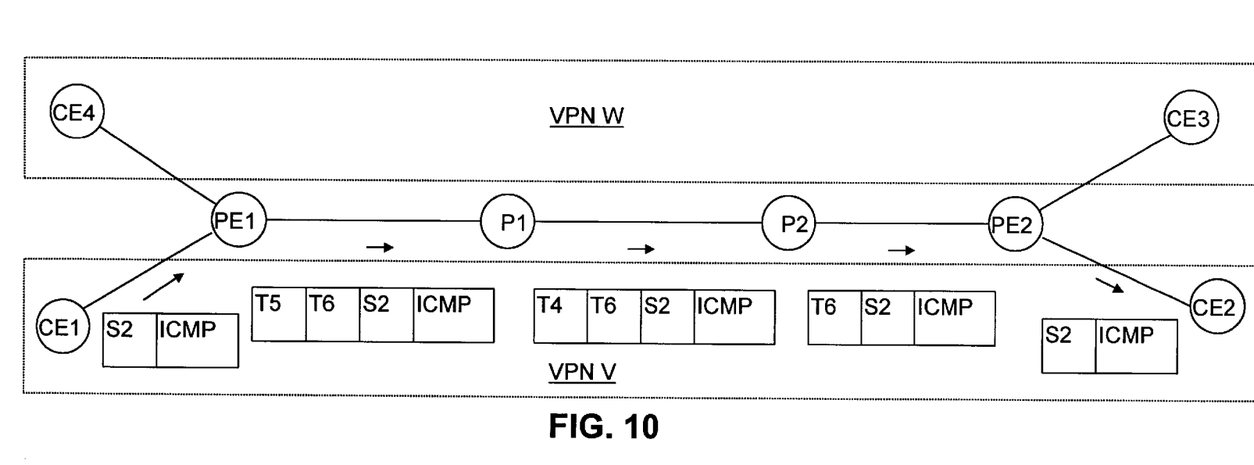
FIG. 10 is a topological diagram of a virtual private network and a taggingsequence employed for ICMP message generated in response to an IP datagram fault condition.

FIGS. 9 and 10 illustrate the routing of the ICMP message of FIG. 8's IP payload field 808. FIG. 9 illustrates the forward path of an Ethernet packet containing the IP datagram in FIG. 4's payload field 406. The IP datagram is transmitted from a first customer edge router CE2 to a first service provider tag-switching edge router PE2. For simplicity, only the destination IP address field 414 (containing IP address "D1") and the IP payload field 408 (DATA) of the IP datagram are shown in FIG. 9. The service provider edge router PE2 prepends a tag stack 420 to the IP datagram and forwards the tagged IP datagram to a first tag-switching transit router P2. The transit router P2 detects a fault condition and generates an ICMP message that it places into the payload field 808 of the IP datagram of FIG. 8. In doing so, it also places the source IP address of the original IP datagram into the destination IP address of the ICMP message, so the drawing shows the new value "S2" in destination IP address field 714. The transit router P2 prepends a tag stack 820 to the ICMP message as described above.

A tag-switching transit router utilizing the present invention is able to generate and forward tagged ICMP messages with minimal changes to its existing IP and packet routing processes and without the need to store any additional routing information. In fact, the only extra step that is required is the prepending of the tag stack of the discarded IP datagram to the ICMP message. This continued reliance on the use of tags for packet routing also means that the transit router can generate and properly forward ICMP messages even when the IP address space of a VPN is not globally unique. These are significant advantages because tag-switching is employed on a network specifically to speed the forwarding of packets through a transit router and to reduce the amount of routing information that must be stored on it.

The transit router P2 transmits the tagged ICMP message along the forward path of the discarded IP datagram to a second tag-switching transit router P1. The transit router P1 strips the top tag T1 and forwards the tagged ICMP message to the forward path egress router, second service provider tag-switching edge router PE1. The service provider edge router PE1 strips the top tag T3 and forwards the ICMP message to a second customer edge router CE1, in accordance with the information in the forwarding table entry that T3 identifies.

The tagged packet carrying the faulty IP datagram in the example of FIG. 9 has a two entry tag stack. Those skilled in the art will recognize that the ICMP message routing scheme of the present invention operates independently of the number of entries in a tag stack. Therefore, a tag-switching router incorporating the present invention can also generate and route ICMP messages against tagged packets having single entry tag stacks or tag stacks with three or more entries. In addition, in some situations where a tag stack includes three or more entries, the top tag may forward the packet to a transit router having a route to the source device of the original IP datagram. In that case, the tag stack may be stripped and the ICMP message forwarded using the conventional IP routing method.

FIG. 10 illustrates the return path of the Ethernet packet containing the ICMP message in IP payload field 808. The customer edge router CE1 simply reverses the direction of the ICMP message by determining from the S2 destination IP address field 814 that the ingress router of the return route of the ICMP message is the egress edge router of the forward path, service provider edge router PE1. Since the packet is not tagged and comes from VPN W, the service provider edge router PE1 prepends a new tag stack comprised of top tag T5, which P1 has asked to be placed in PE2-destined packets, and bottom tag T6, which PE2 has asked to be placed in S2-destined packets, to the ICMP message and forwards the tagged ICMP message to transit router P1. Transit router P1 replaces the top tag T5 with a replacement tag T4 and forwards the tagged ICMP message to transit router P2. Transit router P2 strips the top tag T4 from the tag stack and forwards the tagged ICMP message to service provider edge router PE2. The egress router of the return path, service provider edge router PE2, strips the top tag T6 and forwards the ICMP message to customer edge router CE2. The customer edge router CE2 forwards the ICMP message to the network device which is the source of the discarded IP datagram.

Although ICMP messages generated by a tag-switching transit router incorporating the present invention may travel a longer route than conventionally generated ICMP messages, their routing imposes no special requirements on other routers within the tag-switching backbone or on customer edge routers. These routers simply forward tagged ICMP messages as they are configured to do for normal tag-switching and VPN operation. In particular, there is no impact to the operation of a VPN, which may continue to operate within a self-defined IP address space.

While the present invention provides a simple way for tag-switching networks to route transit router-generated ICMP messages, those skilled in the art will recognize that application of the present invention is not limited to ICMP message routing. Any communications packet that is generated at a tag-switching transit router in response to a tagged input packet may be properly routed back to the originator of the packet by using the inventive method.

What is claimed is:

1. A tag-switching router comprising:
   A) circuitry for receiving an input packet, said input packet including an input IP datagram containing an input IP payload and prepended with a tag stack containing a top tag stack entry that includes a top tag, said input IP datagram including an input source IP address and an input destination IP address;
   B) memory circuitry containing a forwarding table, said top tag pointing to a forwarding entry in the forwarding table, said forwarding entry containing a replacement tag and the identity of a link over which the input IP datagram is to be forwarded;
   C) circuitry for replacing the top tag in the tag stack with the replacement tag;
   D) circuitry for generating at least one output packet, said output packet:
      i) including, if the input IP datagram has any one of a set of at least one predetermined fault condition, an output IP datagram containing an ICMP message and prepended with the tag stack that includes the replacement tag, said output IP datagram having the input source IP address as its destination address;
      ii) otherwise including at least a fragment of the input IP payload and prepended with the tag stack that includes the replacement tag, said at least one output packet having the input destination IP address as its destination address; and
   E) circuitry for forwarding each output packet over the link identified in the forwarding entry.

2. The tag-switching router of claim 1, wherein
   the top tag stack entry includes a time-to-live field that successive routers decrement; and
   one said fault condition is a lifetime-expired condition, which occurs when the time-to-live field of the top tag stack entry has been decremented to zero.

3. The tag-switching router of claim 1, wherein
   the input IP datagram includes a don't fragment bit;
   one said fault condition is a packet-too-large condition, which occurs when the input IP datagram's don't-fragment bit is set and the input IP payload is too large to transmit unfragmented over the link that the forwarding entry identifies.

4. A tag-switching network comprising a plurality of interconnected edge routers and transit routers, wherein:
   A) each transit router includes:
      i) circuitry for receiving a transit-router input packet, said transit-router input packet including a transit-router input IP datagram containing an input IP payload and prepended with a transit-router tag stack containing a top tag stack entry that includes a top tag, said transit-router input IP datagram including an input source IP address and an input destination IP address;

ii) memory circuitry containing a transit-router forwarding table, said top tag pointing to a top tag forwarding entry in the transit-router forwarding table, said top tag forwarding entry containing a replacement tag and the identity of a transit-router link over which the transit-router input IP datagram is to be forwarded;

iii) circuitry for replacing the top tag of the transit-router tag stack with the replacement tag;

iv) circuitry for generating at least one transit router output packet, said transit router output packet:
  (a) including, if the transit-router input IP datagram has any one of a set of at least one predetermined fault conditions, a transit-router output IP datagram containing an ICMP message and prepended with the transit-router tag stack that includes the replacement tag, said transit-router output IP datagram having the input source IP address as a destination address;
  (b) otherwise including at least a fragment of the input IP payload and prepended with the transit-router tag stack that includes the replacement tag, said at least one transit router output packet having the input destination IP address as a destination address; and v) circuitry for forwarding each transit-router output packet over the transit-router link identified in the top tag forwarding entry; and B) at least one said edge router includes:
  i) circuitry for receiving from at least one of the plurality of transit routers an edge-router input packet that includes the transit-router output IP datagram containing the ICMP message and prepended with an edge-router tag stack containing an egress-forwarding tag stack entry that includes an egress-forwarding tag;
  ii) memory circuitry containing an edge-router forwarding table in which said egress-forwarding tag points to an edge-router forwarding entry containing the identity of an egress link over which the edge-router input packet containing the egress-forwarding tag is to be forwarded;
  iii) circuitry for removing the edge-router tag stack prepended to the ICMP message containing edge-router input packet;
  iv) circuitry for generating an edge-router output packet, said edge-router output packet including the transit-router output IP datagram containing the ICMP message; and
  v) circuitry for forwarding the edge-router output packet without a tag stack to a customer edge router over the egress link identified in the edge-router forwarding entry.

5. The tag-switching network of claim 4, wherein
the top tag stack entry includes a time-to-live field that successive routers decrement; and
one said fault condition is a lifetime-expired condition, which occurs when the time-to-live field of the top tag stack entry has been decremented to zero.

6. The tag-switching network of claim 4, wherein
the input IP datagram includes a don't fragment bit;
one said fault condition is a packet-too-large condition, which occurs when the transit-router input IP datagram's don't-fragment bit is set and the input IP payload is too large to transmit unfragmented over the transit-router link that the top tag forwarding entry identifies.

7. A method for routing ICMP messages over a tag-switching network employing a tag-switching router to perform the steps of:

A) receiving an input packet, said input packet including an input IP datagram containing an input IP payload and prepended with a tag stack containing a top tag stack entry that includes a top tag, said input IP datagram including an input source IP address and an input destination IP address;

B) retrieving a replacement tag and the identity of a link over which the input IP datagram is to be forwarded from memory circuitry at a forwarding entry in a forwarding table pointed to by the top tag;

C) replacing the top tag in the tag stack with the replacement tag;

D) generating at least one output packet, said output packet:
  i) including, if the input IP datagram has any one of a set of at least one predetermined fault condition, an output IP datagram containing an ICMP message and prepended with the tag stack that includes the replacement tag, said output IP datagram having the input source IP address as its destination address;
  ii) otherwise including at least a fragment of the input IP payload and prepended with the tag stack that includes the replacement tag, said at least one output packet having the input destination IP address as its destination address; and E) forwarding each output packet over the link identified in the forwarding entry.

8. The method of claim 7, wherein
the top tag stack entry includes a time-to-live field that successive routers decrement; and
one said fault condition is a lifetime-expired condition, which occurs when the time-to-live field of the top tag stack entry has been decremented to zero.

9. The method of claim 7, wherein
the input IP datagram includes a don't fragment bit;
one said fault condition is a packet-too-large condition, which occurs when the input IP datagram's don't-fragment bit is set and the input IP payload is too large to transmit unfragmented over the link that the forwarding entry identifies.

10. A method for routing ICMP messages over a tag-switching network comprising a plurality of interconnected edge routers and transit routers, said method including the steps of:

A) operating each transit router so that it:
  i) receives a transit-router input packet, said transit-router input packet including a transit-router input IP datagram containing an input IP payload and prepended with a transit-router tag stack containing a top tag stack entry that includes a top tag, said transit-router input IP datagram including an input source IP address and an input destination IP address;
  ii) retrieves a replacement tag and the identity of a transit-router link over which the transit-router input IP datagram is to be forwarded from memory circuitry at a top tag forwarding entry in a transit-router forwarding table pointed to by the top tag;

iii) replaces the top tag of the transit-router tag stack with the replacement tag;

iv) generates at least one transit router output packet, said transit router output packet:

(a) including, if the transit-router input IP datagram has any one of a set of at least one predetermined fault conditions, a transit-router output IP datagram containing an ICMP message and prepended with the transit-router tag stack that includes the replacement tag, said transit-router output IP datagram having the input source IP address as a destination address;

(b) otherwise including at least a fragment of the input IP payload and prepended with the transit-router tag stack that includes the replacement tag, said at least one transit router output packet having the input destination IP address as a destination address; and v) forwards each transit-router output packet over the transit-router link identified in the top tag forwarding entry; and B) operating at least one said edge router so that it:

i) receives from at least one of the plurality of transit routers an edge-router input packet that includes the transit-router output IP datagram containing the ICMP message and prepended with an edge-router tag stack containing an egress-forwarding tag stack entry that includes an egress-forwarding tag;

ii) retrieves the identity of an egress link over which the edge-router input packet containing the egress-forwarding tag is to be forwarded from memory circuitry at an edge-router forwarding entry in an edge-router forwarding table pointed to by the egress-forwarding tag;

iii) removes the edge-router tag stack prepended to the ICMP message containing edge-router input packet;

iv) generates an edge-router output packet, said edge-router output packet including the transit-router output IP datagram containing the ICMP message; and v) forwards the edge-router output packet without a tag stack to a customer edge router over the egress link identified in the edge-router forwarding entry.

11. The method of claim 10, wherein the top tag stack entry includes a time-to-live field that successive routers decrement; and one said fault condition is a lifetime-expired condition, which occurs when the time-to-live field of the top tag stack entry has been decremented to zero.

12. The method of claim 10, wherein the input IP datagram includes a don't fragment bit;

one said fault condition is a packet-too-large condition, which occurs when the transit-router input IP datagram's don't-fragment bit is set and the input IP payload is too large to transmit unfragmented over the transit-router link that the top tag forwarding entry identifies.

13. A storage medium containing instructions readable by a tag-switching router processor to cause the router to perform the steps of:

A) receiving an input packet, said input packet including an input IP datagram containing an input IP payload and prepended with a tag stack containing a top tag stack entry that includes a top tag, said input IP datagram including an input source IP address and an input destination IP address;

B) retrieving a replacement tag and the identity of a link over which the input IP datagram is to be forwarded from memory circuitry at a forwarding entry in a forwarding table pointed to by the top tag;

C) replacing the top tag in the tag stack with the replacement tag;

D) generating at least one output packet, said output packet:

i) including, if the input IP datagram has any one of a set of at least one predetermined fault condition, an output IP datagram containing an ICMP message and prepended with the tag stack that includes the replacement tag, said output IP datagram having the input source IP address as its destination address;

ii) otherwise including at least a fragment of the input IP payload and prepended with the tag stack that includes the replacement tag, said at least one output packet having the input destination IP address as its destination address; and E) forwarding each output packet over the link identified in the forwarding entry.

14. The storage medium of claim 13, wherein the top tag stack entry includes a time-to-live field that successive routers decrement; and one said fault condition is a lifetime-expired condition, which occurs when the time-to-live field of the top tag stack entry has been decremented to zero.

15. The storage medium of claim 13, wherein the input IP datagram includes a don't fragment bit;

one said fault condition is a packet-too-large condition, which occurs when the input IP datagram's don't-fragment bit is set and the input IP payload is too large to transmit unfragmented over the link that the forwarding entry identifies.

* * * * *